US005547766A

United States Patent [19]
Gobran

[11] Patent Number: 5,547,766
[45] Date of Patent: Aug. 20, 1996

[54] NON-YELLOWING TAPE ARTICLE

[75] Inventor: Ramsis Gobran, Roseville, Minn.

[73] Assignee: Minnesota Mining and Manufacturing Company, St. Paul, Minn.

[21] Appl. No.: 508,588

[22] Filed: Jul. 28, 1995

[51] Int. Cl.⁶ .................... C08L 25/08; B05D 5/10
[52] U.S. Cl. ............. 428/515; 428/500; 428/516; 428/517; 428/523; 427/208.4; 427/208.8
[58] Field of Search ................. 428/515, 523, 428/500, 516, 517; 427/208.4, 208.8

[56] References Cited

U.S. PATENT DOCUMENTS

| | | | |
|---|---|---|---|
| 2,532,011 | 11/1950 | Dahlquist et al. | 154/53.5 |
| 5,145,718 | 9/1992 | Pedginski et al. | 427/171 |
| 5,214,119 | 5/1993 | Leir et al. | 528/28 |
| 5,290,615 | 3/1994 | Tushaus et al. | 428/40 |

*Primary Examiner*—W. Robinson H. Clark
*Attorney, Agent, or Firm*—Gary L. Griswold; Walter N. Kirn; William J. Bond

[57] ABSTRACT

A non-yellowing pressure-sensitive adhesive tape with a polyolefin film layer and a fibrous web layer. A propylene film layer has an an antioxidant package of:

(i) 0.004 to 0.04 weight percent of Irganox™ 1010;
(ii) 0.03 to 0.2 weight percent of a solid phosphite antioxidant;
(iii) 0.05 to 0.4 weight percent of a thioester; and
(iv) 0.05 to 0.4 weight percent of an inorganic acid scavenger;

The tackified synthetic rubber pressure-sensitive adhesive layer comprises 100 parts of a polystyrene-polydiene block copolymer, and 20 to 300 parts of a compatible tackifying agent and an antioxidant package, based on 100 parts of the polystyrene-polydiene block copolymer, comprising:

(i) 0.1 to 0.6 parts Irganox™ 1010;
(ii) 0.1 to 0.6 parts Irganox™ 565;
(iii) 0.0 to 0.6 parts of a phosphite antioxidant.

8 Claims, No Drawings

NON-YELLOWING TAPE ARTICLE

BACKGROUND AND FIELD OF THE INVENTION

The present invention relates to non-yellowing tapes formed with a synthetic resin pressure-sensitive adhesive and a polyolefin film backing.

It has been found that pressure-sensitive adhesive tape articles, particularly extrusion coated fibrous tapes where a film layer is extrusion coated onto a fibrous web material to form the tape backing with the film layer subsequently coated with a pressure-sensitive adhesive, are particularly susceptible to oxidation and yellowing. Generally, this yellowing has little effect on functional performance but still is highly undesirable from the perspective of aesthetics and consumer perceptions. It is a problem particularly noticeable with polypropylene-type resin film layers and synthetic block copolymer pressure-sensitive adhesive compositions. There is a need to develop antioxidant formulations which will address the tendency for these tape products to yellow over time.

SUMMARY OF THE INVENTION

There is provided a non-yellowing pressure-sensitive adhesive tape comprising a polypropylene film layer having an antioxidant package in the film layer of:
  (i) 0.004 to 0.04 weight percent of Irganox™ 1010, preferably 0.005 to 0.02 weight percent;
  (ii) 0.03 to 0.2 weight percent of a solid phosphite antioxidant, preferably 0.04 to 0.12 weight percent;
  (iii) 0.05 to 0.4 weight percent of a thioester, preferably 0.01 to 0.2 weight percent; and
  (iv) 0.05 to 0.4 weight percent of an inorganic acid scavenger;
a tackified synthetic rubber pressure-sensitive adhesive layer comprising 100 parts of a polystyrene-polydiene block copolymer, and 20 to 300 parts of a compatible tackifying agent and an antioxidant package, based on 100 parts of the polystyrene-polydiene block copolymer, comprising:
  (i) 0.1 to 0.6 parts Irganox™ 1010;
  (ii) 0.1 to 0.6 parts Irganox™ 565;
  (iii) 0.0 to 0.6 pads of a phosphite antioxidant;
preferably, the adhesive layer antioxident package comprises:
  (i) 0.1 to 0.3 pads Irganox™ 1010;
  (ii) 0.1 to 0.3 parts Irganox™ 565;
  (iii) 0.0 to 0.4 parts of a phosphite antioxident.

DETAILED DESCRIPTION OF THE PREFERRED EMBODIMENTS

The pressure-sensitive adhesive tape of the invention comprises at least two non-adhesive layers forming the tape backing, namely a thermoplastic polymer film layer and a fibrous web layer. The preferred thermoplastic polymer film layer is a polyolefin film or coextruded film with a polypropylene film or film layer being particularly desirable. A first face of the polypropylene film layer is coated with a pressure-sensitive adhesive and generally the opposite face of the film layer is provided with a fibrous web layer. The fibrous web layer can be a thermoplastic fibrous web such as a nonwoven web, knitted web, stitch-bonded web, or a woven web or the like. The fibers forming the fibrous web generally are thermoplastic materials such as a polyolefins or polyesters, with polyesters generally being preferred. The fibrous web is then laminated or extrusion coated with the thermoplastic polymer film layer, preferably a polypropylene film. The film layer prevents the pressure-sensitive adhesive from blocking the tape by flowing through the open nonwoven fibrous structure. Generally, a polypropylene film layer is a polypropylene homopolymer, copolymer or blend such as with ethylene, or polyethylene or other alpha-olefin alkyl-monomers and polymers.

The pressure-sensitive adhesive is a tackified elastomer where the elastomer is an A-B type block copolymer, wherein the A blocks and B blocks are configured in linear, radial or star configurations. The A block is a mono-alkenyl-arene, preferably polystyrene having a molecular weight between 4000 and 50,000, preferably between 7000 and 30,000. The A block content is preferably about 10 to 50 percent, preferably about 10 to 30 percent of the block copolymer. Other suitable A blocks may be formed from alpha-methylstyrene, t-butyl-styrene and other ring alkylated styrenes, as well as mixtures thereof. The B block is an elastomeric conjugated diene, generally polyisoprene having an average molecular weight from about 5000 to about 500,000, preferably from about 50,000 to about 200,000. The tackifying components for the elastomer-based adhesives generally comprise solid tackifying resin and/or a liquid tackifier or plasticizer. Preferably, the tackifying resins are selected from the group of resins at least partially compatible with the polyisoprene or diene B block portion of the elastomer. Although not preferred, generally a relatively minor amount of the tackifying resin can include resins compatible with the A block, which when present are generally termed end block reinforcing resins. Generally, end block resins are formed from aromatic monomer species.

Suitable liquid tackifiers or plasticizers for use in the fastening tape tab adhesive composition include napthenic oils, paraffin oils, aromatic oils, mineral oils or low molecular weight rosin esters, polyterpenes and C-5 resins.

The tackifier portion of the pressure-sensitive adhesive generally comprises from 20 to 300 parts per 100 parts of the elastomeric phase. Preferably, this is predominately solid tackifier, however, from 0 to 25 weight percent, preferably 0 to 10 weight percent of the adhesive can be liquid tackifier and/or plasticizer.

EXAMPLES

Example 1

A roll of warp knit, weft inserted texturized polyester fibrous loop fabric (MILLILOCK™ Style No. 924107-640 available from Milliken Co.) was extrusion coated on the side opposite the side with upstanding fiber loops with an approximate 2.0 mil (50 microns) film layer of polypropylene resin. The polypropylene resin used was a TENITE™ P9-015 type resin with an antioxidant combination of IRGANOX™ 1010, IRGAFOS™ 168, a thioester, and hydrotalcite (experimental resin #X22807-37-3 from Eastman Chemical Co.; now available from Huntsman chemical as #P9-026). A release coating (a 5% solution of polyvinyl N-octadecyl carbamate prepared as described in U.S. Pat. No. 2,532,011) was then coated onto the fibrous loop side of the polypropylene backed fibrous loop material. The excess solvent was dried in a forced air oven at approximately 170° F. (77° C.) to provide a dried release coating on the loops. A pressure-sensitive adhesive was then hot melt coated onto the polypropylene film layer. The adhesive composition used was 77 parts of KRATON™ 1111 styrene-isoprene type block copolymer resin, 23 parts SHELLFLEX™ 371 OIL liquid tackifying resin, 92 parts WINGTACK™ PLUS solid tackifying resin, 1 part IRGANOX™ 1010 antioxidant, and 1 part IRGANOX™ 565 antioxidant. The adhesive coating thickness was 50 microns.

Sheet samples of the adhesive coated fibrous loop material (loop tape) were aged for 12 days at room temperature, 120° F. (48° C.), and 140° F. (60° C.) and then were visually inspected for any discoloration or yellowing. None of the samples had yellowed. All of the samples remained white. However, on natural aging over an approximate three month time period, a hint of yellow color was observed to appear on the edge of the loop tape (in roll form).

Example 1 and then were visually inspected for any discoloration or yellowing. All of the samples had yellowed to some extent.

Examples 3–5

These examples were prepared to evaluate adhesives prepared with a different styrene-isoprene type block copolymer elastomer. These examples examine the effect that various antioxidant combinations in the adhesive had on the discoloration of the loop tape. The adhesives compositions outlined in Table I below were hot melt coated onto a polypropylene backed fibrous loop material that had been prepared as described in Example 1.

TABLE I

| Example | Elastomer (parts) | Solid Tackifying Resin (parts) | Antioxidant (parts[1]) |
|---------|-------------------|-------------------------------|------------------------|
| 3 | 100 | WINGTACK ™ 95 (80) | IRGANOX ™ 565(0.1) IRGANOX ™ 1010 (0.1) |
| 4 | 100 | WINGTACK ™ 95 (80) | IRGANOX ™ 565 (0.1) POLYGARD ™ HR (0.3) |
| 5 | 100 | WINGTACK ™ 95 (80) | IRGANOX ™ HR (0.1) POLYGARD ™ HR (0.3) NAUGARD ™ 445 (0.3) |

[1]parts per 100 parts elastomer

Comparative Example 1

A roll of loop tape was prepared as described in Example 1 except that 2 parts of IRGANOX™ 1076 antioxidant was added to the adhesive instead of the IRGANOX™ 1010/ IRGANOX™ 565 combination. Samples of the loop tape were aged as described in Example 1 and then were visually inspected for any discoloration or yellowing. The samples that were aged at room temperature remained white; however, the samples that were heat aged at 120° F. (48° C.) and 140° F. (60° C.) had yellowed.

Example 2

A roll of loop tape was prepared as described in Example 1 except that the thermoplastic polymer resin used was experimental resin # X22807- 37-1 available from Eastman Chemical Co. now Huntsman Chemical (zinc oxide used instead of hydrotalcite ). Samples of the loop tape were aged as described in Example 1 and then were visually inspected for any discoloration or yellowing. None of the samples had yellowed. All of the samples remained white. However, on natural aging over an approximate three month time period, a hint of yellow color was observed to appear on the edge of the loop tape (in roll form).

Comparative Example 2

A roll of loop tape was prepared as described in Example 2 except that 2 parts of IRGANOX™ 1076 antioxidant was added to the adhesive instead of the IRGANOX™ 1010/ IRGANOX™ 565 combination. Samples of the loop tape were aged as described in Example 1 and then were visually inspected for any discoloration or yellowing. All of the samples had yellowed.

Comparative Example 3

A roll of loop tape was prepared as described in Example 1 except that TENITE™ P9-01 5 polypropylene resin was used. Samples of the loop tape were aged as described in The adhesive coating thickness for all loop tape samples was 38 microns. Sheet samples of the loop tapes were aged at room temperature for 15 days and were also heat aged for 15 days at 140° F. (60° C.). The samples were then evaluated for yellowing by measuring LAB values (e.g., TAPPI test procedure #T-524). The LAB values were measured using a LABSCAN™ Spectro Colorimeter (Hunter Associates Laboratory, Inc.; Reston, Va.).

Room temperature aged data is summarized in Table II and heat aged data is summarized in Table III. The LAB values were measured at the center of the sheet and also along an edge of the sheet.

TABLE II

| Example | L average (edge; center) | A average (edge; center) | B average (edge; center) |
|---------|--------------------------|--------------------------|--------------------------|
| 3 | 94.01; 94.05 | −1.23; −1.29 | 2.21; 2.31 |
| 4 | 93.94; 93.97 | −1.28; −1.24 | 2.15; 2.03 |
| 5 | 93.99; 94.06 | −1.31; −1.33 | 2.20; 2.27 |

TABLE III

| Example | L average (edge; center) | A average (edge; center) | B average (edge; center) |
|---------|--------------------------|--------------------------|--------------------------|
| 3 | 93.65; 93.685 | −1.38; −1.39 | 2.82; 2.81 |
| 4 | 93.68; 93.43 | −1.21; −1.38 | 2.34; 3.23 |
| 5 | 93.69; 93.82 | −1.32; −1.31 | 2.55; 2.57 |

The L value is a measure of whiteness. The higher the L value, the more white the sample. The A value is a measure of green to red, with a negative number indicating green and a positive red. The B value is a measure of blue to yellow, with a negative number indicating blue and a positive number indicating yellow. The more positive the B value, the more yellow the sample. The samples were essentially white with very little yellow component.

Comparative Example 4 and Examples 6–8

These examples were prepared to examine the effect of varying the amount of antioxidant added to the hot melt pressure-sensitive adhesive formulations. The adhesives outlined in Table IV below were each hot melt coated onto a polypropylene backed loop material that had been prepared as described in Example 1 except that the polypropylene resin used was the TENITE™ P9-015 polypropylene resin. The adhesive coating thickness was 50 microns.

KRATON™ 1119 is a polystyrene-polyisoprene type linear block copolymer available from Shell Chemical Co. having approximately 65% S-I diblock, 35% S-I-S triblock, and a styrene content of about 22%.

WINGTACK™ PLUS is a solid C5 tackifying resin with a Tg of 315° Kelvin and is available from Goodyear Chemical Co.

TABLE IV

| Example | Elastomer (parts) | Solid Tackifying Resin (parts) | Liquid Tackifying Resin (parts) | Antioxidant (parts[1]) |
|---|---|---|---|---|
| C4 | KRATON™ 1111 (77) | WINGTACK™ PLUS (92) | SHELLFLEX™ 371 (23) | IRGANOX™ 1010 (1) + IRGANOX™ 565 (1) |
| 6 | KRATON™ 1111 (77) | WINGTACK™ PLUS (92) | SHELLFLEX™ 371 (23) | IRGANOX™ 1010 + IRGANOX™ 565(0.5) |
| 7 | KRATON™ 1111 (77) | WINGTACK™ PLUS (92) | SHELLFLEX™ 371 (23) | IRGANOX™ 1010 (0.25) + IRGANOX™ 565 (0.25) |
| 8 | KRATON™ 1111 (77) | WINGTACK™ PLUS (92) | SHELLFLEX™ 371 (23) | IRGANOX™ 1010 (0.125) + IRGANOX™ 565 (0.125) |

[1] parts per 100 parts elastomer

The loop tape samples were visually examined for color variation immediately and after approximately three months natural aging. A decrease in the amount of yellowing was observed in going from the higher to the lower amounts of antioxidant.

Example 9

A roll of warp knit, weft inserted texturized polyester fibrous loop fabric (MILLILOCK™ Style No. 924107-640 available from Milliken Co.) was extrusion coated on the side opposite the side with the upstanding fiber loops with an approximate 2.00 mil (50 microns) film layer of polypropylene resin. The polypropylene resin used was #SRC-7-558 available from Shell Chemical Co. The resin had an antioxidant combination of IRGANOX™ 1010, ULTRANOX™ 626, and hydrotalcite. A release coating was then coated onto the fibrous loop side of the polypropylene backed fibrous loop material. The release agent used was an organopolysiloxane-polyurea block copolymer that was prepared by the condensation reaction of an organopolysiloxane diamine with a diisocyanate and a diamine chain extender as described in U.S. Pat. Nos. 5,214,119 and 5,290,615. The release agent was coated as a 5% solution in isopropyl alcohol and was oven dried. A pressure-sensitive adhesive was then hot melt coated onto the polypropylene film layer. The adhesive composition used was 100 pads of a styrene-isoprene type block copolymer resin, 100 parts WINGTACK™ PLUS solid tackifying resin, 0.12 parts IRGANOX™ 1010 antioxidant, and 0.12 parts IRGANOX™ 565 antioxidant. The adhesive coating thickness was 38 microns. The loop tape was then evaluated for yellowing by measuring LAB values as described for Examples 3–5. The LAB values were L=94.03, A=−1.08, and B=2.02.

TENITE™ P9-015 is a polypropylene resin having a MFI of 75 available from Eastman Chemical Co.

KRATON™ 41111 is a polystyrene-polyisoprene type linear block copolymer available from Shell Chemical Co. having approximately 15% S-I diblock, 85% S-I-S triblock, and a styrene content of about 21%.

WINGTACK™ 95 is a solid C5 tackifying resin with a Tg of 323° Kelvin and is available from Goodyear Chemical Co.

SHELLFLEX™ 371 is a napthenic oil having a Tg of 209° Kelvin and is available from Shell Chemical Co.

IRGANOX™ 1076 is a hindered phenol antioxidant (CAS name: Benzenepropanoic acid, 3,5-bis(1,1-dimethylethyl)-4-hydroxy-, octadecyl ester) available from Ciba-Geigy.

IRGANOX™ 1010 is a hindered phenol antioxidant (CAS name: Benzenepropanoic acid, 3,5-bis(1,1-dimethylethyl)-4-hydroxy-,2,2-bis[[3-[3,5-bis(1,1 -dimethylethyl)-4-hydroxyphenyl]-1-oxopropoxy]methyl]-1,3-propanediyl ester) available from Ciba-Geigy.

IRGANOX™ 565 is a hindered phenol antioxidant (CAS name: Phenol, 4-[[4,6-bis(octylthio)-1,3,5-triazine-2-yl] amino]-2,6-bis (1,1-dimethylethyl)-) available from Ciba-Geigy.

IRGAFOS™ 168 is a phosphite antioxidant (CAS name: Phenol, 2,4-bis( 1,1 -dimethylethyl)-, phosphite {3:1}) available from Ciba-Geigy.

POLYGARD™ HR is a phosphite antioxidant (tris-(nonylphenyl) phosphite) available from Uniroyal.

NAUGARD™ 445 is a phosphite antioxidant (tris-(nonylphenyl) phosphite) available from Uniroyal.

ULTRANOX™ 626 is a phosphite antioxidant (bis(2,4-di-t-butyl)pentaerythritol diphosphite) available from Borg-Warner.

I claim:

1. A non-yellowing pressure-sensitive adhesive tape comprising a polypropylene film layer having an antioxidant package of:
   (i) 0.004 to 0.04 weight percent of benzenepropanoic acid, 3,5-bis(1,1-dimethylethyl)- 4-hydroxy-, 2,2-bis[ [3-[3,5-bis(1,1-dimethylethyl)-4-hydroxyphenyl]-1-oxopropoxy]methyl]-1,3-propanediyl ester);
   (ii) 0.03 to 0.2 weight percent of a solid phosphite antioxidant;

(iii) 0.0 to 0.4 weight percent of a thioester;

(iv) 0.05 to 0.4 weight percent of an inorganic acid scavenger;

a tackified synthetic rubber pressure-sensitive adhesive layer comprising 100 parts of a polystyrene-polydiene block copolymer and 20 to 300 parts of a compatible tackifying resin, oil or plasticizer and an antioxidant package based on 100 parts of the polystyrene-polydiene block copolymer comprising:

(i) 0.1 to 0.6 parts benzenepropanoic acid, 3,5-bis(1,1-dimethylethyl)- 4-hydroxy-, 2,2-bis[[3-[3,5-bis(1,1-dimethylethyl)-4-hydroxyphenyl]-1-oxopropoxy]methyl]-1,3-propanediyl ester);

(ii) 0.1 to 0.6 parts phenol, 4-[[4,6-bis(octylthio)-1,3,5-triazine-2-yl]amino]-2,6-bis(1,1-dimethylethyl)-);

(iii) 0.0 to 0.6 parts of a phosphite antioxidant.

2. A non-yellowing tape of claim 1 further comprising a fibrous web layer.

3. The non-yellowing tape of claim 2 wherein the polypropylene film layer is a polypropylene copolymer of ethylene and propylene.

4. The non-yellowing tape of claim 2 wherein the polypropylene film layer is a blend of a polypropylene homopolymer or copolymer and polyethylene homopolymer or copolymer.

5. The non-yellowing tape of claim 2 wherein the fibrous web layer is a polyester fibrous web having a first face and a second face, the first face laminated to said polypropylene film layer.

6. The non-yellowing tape of claim 5 wherein the adhesive layer comprises, based on 100 parts of a polystyrene-polydiene block copolymer, an antioxidant package comprising:

(i) 0.1 to 0.3 parts benzenepropanoic acid, 3,5-bis(1,1-dimethylethyl)- 4-hydroxy-, 2,2-bis[[3-[3,5-bis(1,1-dimethylethyl)-4-hydroxyphenyl]-1-oxopropoxy]methyl]-1,3-propanediyl ester);

(ii) 0.1 to 0.3 parts phenol, 4-[[4,6-bis(octylthio)-1,3,5-triazine-2-yl]amino]-2,6-bis(1,1-dimethylethyl)-);

(iii) 0.0 to 0.4 of a phosphate antioxidant.

7. The non-yellowing tape of claim 6 wherein the acid scavenger comprises hydrotalcite.

8. The non-yellowing tape of claim 6 wherein the acid scavenger comprising zinc oxide.

\* \* \* \* \*